Figure 1:
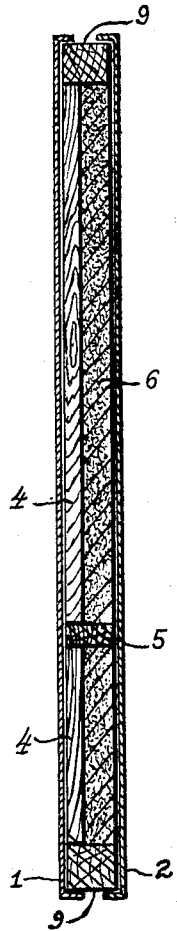
Figure 2:
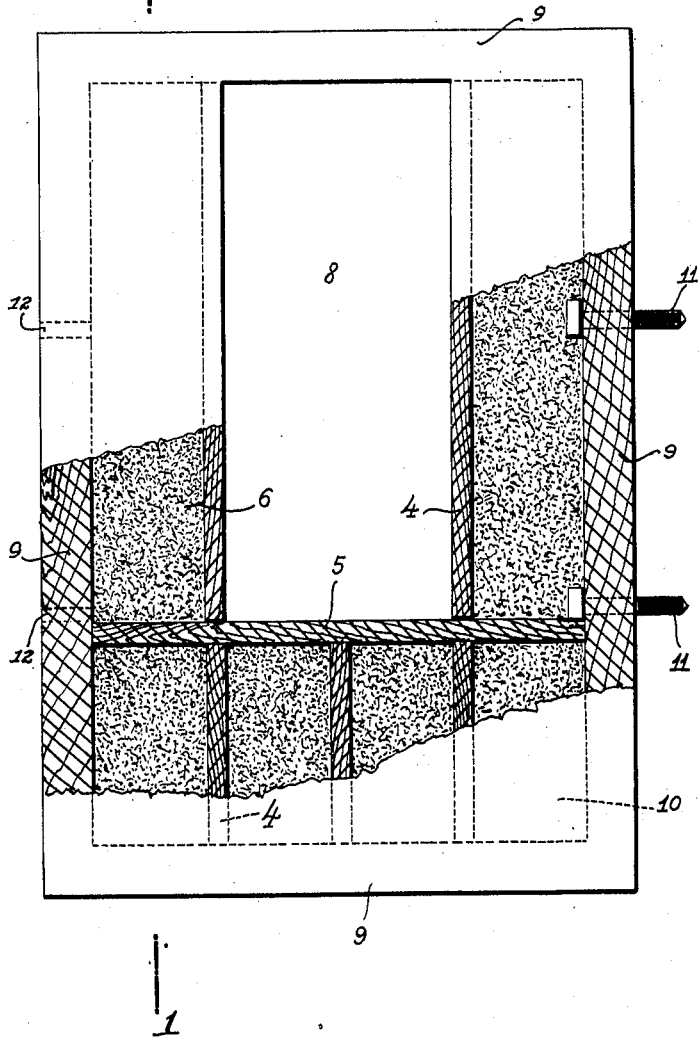

Patented Sept. 11, 1928.

1,683,965

UNITED STATES PATENT OFFICE.

ANTHONY HERMAN GERARD FOKKER, OF AMSTERDAM, NETHERLANDS, ASSIGNOR TO ATLANTIC AIRCRAFT CORPORATION, OF HASBROUCK HEIGHTS, NEW JERSEY, A CORPORATION OF NEW JERSEY.

TAIL SHAFT FOR AIRCRAFT.

Application filed May 5, 1925, Serial No. 28,078, and in the Netherlands May 5, 1924.

The present invention relates generally to control devices for aircraft and is more especially directed to the provision of a tail- tail support as a directional control, when in contact with the ground, in a manner whereby the objectionable counter effect of the re-

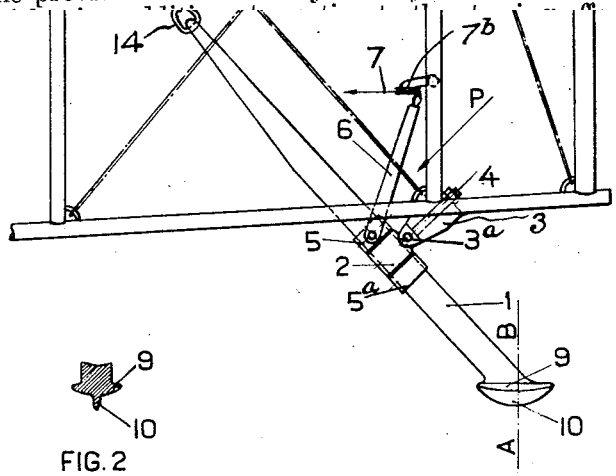

FIG. 2

FIG. 3

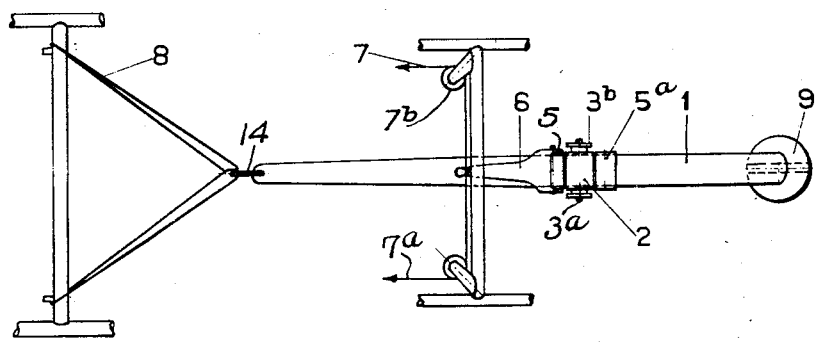

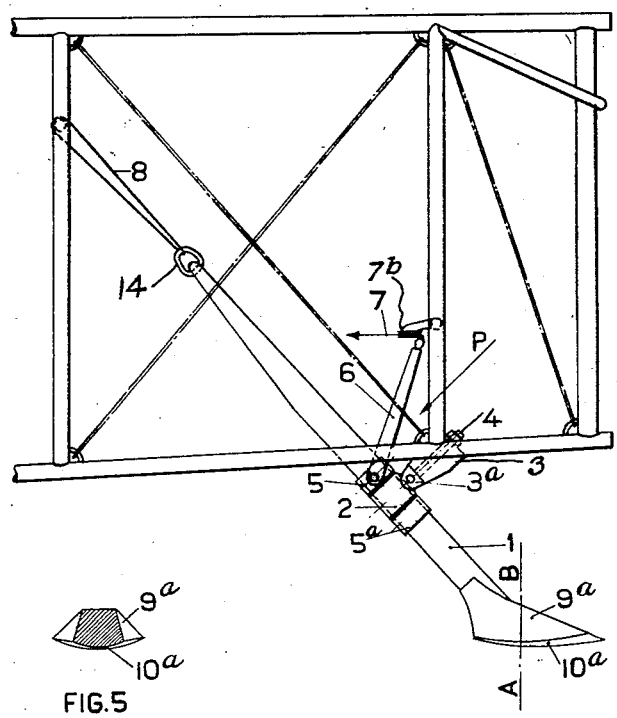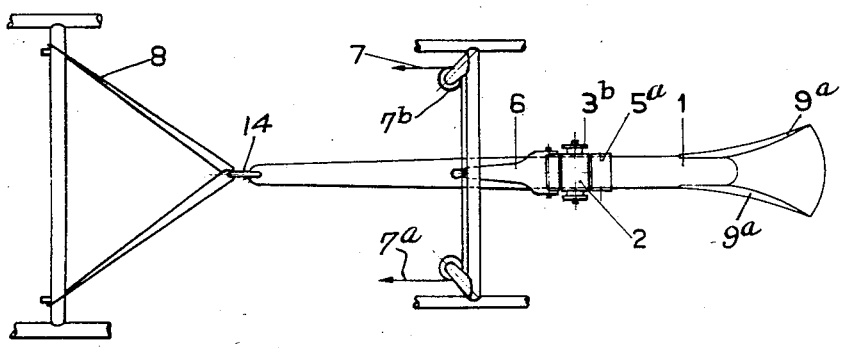

may be attained by locating the lever 6 to coincide with a line at a right angle to the main shaft of the tail-skid which extends through the cardan joint. This lever may be connected to a fixed ring on the skid shaft, situated between two mounting rings which may be joined by means of a bowed member or fitting forming part of the cardan joint. All of such modifications obviously come within the spirit and scope of my invention as defined by the appended claims.

I claim—

1. A tail-skid for aircraft cardanically suspended from the fuselage in an axially inclined position, means for connecting one end of said skid to said fuselage to yield in every direction, cam surfaces at the lower end of said skid and means for rotating said skid on its longitudinal axis to function one or the other of said surfaces to effect a lateral movement of the fuselage.

2. A tail-skid for aircraft adapted to be rotated on its longitudinal axis, cam surfaces carried by the ground-engaging end of said skid and means for rotating said skid to bring one or the other of said surfaces into effective engagement with the ground to exert a lateral force upon said fuselage in a direction opposite to the desired change in direction of the head of the craft.

3. A tail shaft for aircraft adapted to be connected to the fuselage of the craft intermediate of its ends for rotary movement in planes at right angles to each other, a shock absorbing device connecting said shaft to another part of the fuselage and means for rotating said shaft on its longitudinal axis.

4. A tail-skid for aircraft embodying a mounting for connecting said skid to the fuselage of said craft whereby said skid will be capable of rotative movement on two axes in planes at right angles to each other, a shock absorbing device connecting said skid, at a point spaced from said mounting, to another part of the fuselage, cam surfaces carried by the ground-engaging end of said skid, said surfaces converging forwardly, and means for rotating said skid on its longitudinal axis to effect contact between either of said surfaces and the ground and simultaneously develop steering effort to change the head direction of the craft.

5. A tail support for aircraft comprising a shaft, a mounting for said shaft embodying a shaft-engaging element located intermediate of the ends of said shaft, means for attaching said element from a suitable support, said means including fittings relatively movable on axes disposed in planes at right angles to each other, means for rotating said shaft within said element and means for preventing longitudinal movement of said shaft relative to said element.

6. A tail-skid for an airplane comprising a shaft cardanically suspended intermediate its ends from the fuselage of the craft, yieldable means connecting one end of said shaft to the fuselage at a point distant from said cardanic suspension, a shoe at the other end of said shaft embodying forwardly converging cam surfaces adapted to engage the ground, and means for rotating said shaft on its longitudinal axis to effect the engagement of one of said surfaces with the ground.

7. A tail-skid for an airplane comprising a shaft, means for connecting said shaft to the fuselage of a craft for rotative movement on its longitudinal axis, means for permitting yieldable movement of said shaft in every direction in response to shocks and counter forces, a shoe carried by said shaft and provided with forwardly converging cam surfaces, and means for rotating said shaft on its longitudinal axis to cause one or the other of said surfaces to engage the ground and exert turning effort on a vertical axis of the airplane.

8. A tail support for aircraft embodying a shaft cardanically suspended from the fuselage of an airplane in an inclined plane, yieldable means for controlling the transverse axial movement of said shaft, means for rotating said shaft on its longitudinal axis and means at the lower end of said shaft adapted to engage the ground at varying angles of approach in response to the longitudinal rotation of said shaft, to produce steering effort for changing the head direction of the airplane when traveling upon the ground.

9. A means for turning the nose of an airplane to the right or left when traversing the ground, comprising a shaft cardanically suspended from the fuselage of the airplane, yieldable means for controlling the movement of said shaft in response to landing impacts, a ground-engaging surface provided at one end of said shaft and means for rotating said shaft on its longitudinal axis to change the angle of contact between said surface and the ground to produce a lateral thrust upon the fuselage in a direction opposite to that in which the desired turn is to be executed.

10. A means for turning the nose of an airplane to the right or left when traveling upon the ground, independently of the functioning of the vertical surfaces of the craft, comprising a device suspended from the fuselage for relative movement, said device being provided with laterally spaced ground-engaging surfaces disposed in a direction fore and aft of the airplane, the distance between said surfaces diminishing from the rear ends thereof forwardly, and positively controlled means for engaging either of said surfaces with the ground to transmit lateral forces to the fuselage in a direction counter to that in which it is desired to point the craft.

11. A tailskid for airplanes, embodying a ground-engaging portion having laterally spaced surfaces intersecting a transverse axis of said portion, the distance between said surfaces diminishing from the rear thereof forwardly, and means for positively rotating said ground-engaging portion on its longitudinal axis to effect contact between one of said surfaces and the ground, whereby the angle of such surface relative to the longitudinal axis of said ground-engaging portion will be productive of a lateral thrust transmitted along said tailskid to the part of the airplane structure to which said tailskid is attached.

12. A tailskid adapted to function as a steering element for an airplane when traveling upon the ground, comprising a shaft cardanically suspended intermediate its ends from the fuselage of an airplane, means for yieldably connecting the upper end of said shaft to a part of the fuselage, the lower end of said shaft being provided with spaced ground-engaging surfaces converging towards their forward ends, and means for positively rotating said shaft on its longitudinal axis to engage either of said surfaces with the ground, the angle of approach of the effective surface relative to the line of movement of the craft producing a lateral thrust transmitted to the fuselage in a direction counter to that in which the head of the airplane is to be turned.

ANTHONY HERMAN GERARD FOKKER.

oval or annular in shape, the under surface thereof having a longitudinally and medially disposed sharp cam or rib 10, preferably of the shape shown in Figure 1.

When the skid is in its normal position, as when the craft is at rest or taxiing in a scribed, the skid may be rotated within its bearing 2 with a minimum of effort on the part of the pilot.

While I have described my invention with reference to the structures shown, it may be pointed out that equally satisfactory results Sept. 11, 1928.

F. FÖRSTER 1,683,966

PORTABLE BUILDING

Filed April 23, 1925   2 Sheets-Sheet 1

Inventor
Frigyes Förster
per Pennie Davis Marvin Edmonds
Attorneys